(12) United States Patent
Wilke (10) Patent No.: US 8,312,892 B2
(45) Date of Patent: Nov. 20, 2012

(54) DEVICE AND METHOD FOR DETERMINING A FAILURE MODE OF A PNEUMATIC CONTROL VALVE ASSEMBLY

(75) Inventor: Galen Dale Wilke, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 639 days.

(21) Appl. No.: 12/497,059

(22) Filed: Jul. 2, 2009

(65) Prior Publication Data

US 2011/0001070 A1 Jan. 6, 2011

(51) Int. Cl.
*F16K 37/00* (2006.01)

(52) U.S. Cl. ............ 137/312; 137/557; 251/129.04

(58) Field of Classification Search ............ 137/312, 137/557; 251/129.04; 340/605; 702/51; 73/40, 40.5 R
See application file for complete search history.

(56) References Cited

U.S. PATENT DOCUMENTS

| | | | | |
|---|---|---|---|---|
| 3,447,555 | A * | 6/1969 | Jenney | 137/557 |
| 4,791,254 | A * | 12/1988 | Polverari | 340/610 |
| 5,197,328 | A * | 3/1993 | Fitzgerald | 137/487.5 |
| 5,329,956 | A | 7/1994 | Marriott et al. | 137/557 |
| 5,573,032 | A * | 11/1996 | Lenz et al. | 137/487.5 |
| 5,855,646 | A * | 1/1999 | Verini | 95/23 |
| 6,449,715 | B1 | 9/2002 | Krivoshein | |
| 6,745,084 | B2 * | 6/2004 | Boger et al. | 700/13 |
| 7,219,691 | B2 | 5/2007 | Gethmann et al. | |
| 7,516,043 | B2 | 4/2009 | Junk et al. | |
| 7,940,189 | B2 * | 5/2011 | Brown | 340/605 |
| 2001/0037159 | A1 | 11/2001 | Boger et al. | |
| 2003/0019297 | A1 | 1/2003 | Fiebelkorn et al. | |

FOREIGN PATENT DOCUMENTS

| | | |
|---|---|---|
| DE | 296 12 346 U1 | 9/1997 |
| DE | 197 12 852 A1 | 10/1998 |
| DE | 199 47 129 A1 | 4/2001 |
| EP | 0 625 790 A1 | 11/1994 |
| JP | 2000275072 A | 10/2000 |
| WO | WO-98/02685 A1 | 1/1998 |
| WO | WO-2009/111101 A1 | 9/2009 |

OTHER PUBLICATIONS

"Non-Adjustable Flow Switches" M-64 Series, Malema flow sensors, 3 pages, Copyright 1998.
"Non-Adjustable Flow Switches" M-60 Series, Malema flow sensors, 4 pages, Copyright 1998.
Gentech Sensing Solutions Product characteristics for model FCS-04 Flow sensor, printed on Nov. 4, 2009 from http://www.gentechsensors.com/content/product/fcs-04. 3 pages.

(Continued)

*Primary Examiner* — Eric Keasel
(74) *Attorney, Agent, or Firm* — Marshall, Gerstein & Borun LLP (57) ABSTRACT

A control valve assembly is capable of diagnosing malfunctions in the control valve assembly and discerning a location of a control fluid leak in the control valve assembly. The control valve assembly includes a control valve, an actuator and a positioner. The actuator includes an actuator vent in an actuator housing, the actuator vent being connected to a flow switch. By determining a flow condition through the actuator vent, the positioner determines whether a control fluid leak is located in a control line or in a diaphragm.

13 Claims, 6 Drawing Sheets

OTHER PUBLICATIONS

Product Bulletin 62.1:DVC6000, Emerson Process Management, dated Feb. 2008.
International Search Resort for PCT/US2009/031273, mailed Jun. 25, 2009.
International Search Report for PCT/US2010/035141, dated Oct. 7, 2010.
Written Opinion of the International Search Authority for PCT/US2010/035141, dated Oct. 7, 2010.

* cited by examiner

DEVICE AND METHOD FOR DETERMINING A FAILURE MODE OF A PNEUMATIC CONTROL VALVE ASSEMBLY

FIELD OF THE DISCLOSURE

The disclosure generally relates to control valve assemblies and, more particularly, to control valve assemblies that diagnose and report failure modes in a control valve.

BACKGROUND OF THE DISCLOSURE

Process control valves are used in myriad industrial applications for controlling the flow of a fluid. For example, in chemical processing plants or oil refineries, control valves are used to manipulate a flowing fluid to compensate for increases or decreases in demand, or other load disturbances, and thus keep the fluid flow regulated.

The control valve is typically provided as part of a control valve assembly having a control valve, a control valve actuator, and a positioner. The control valve includes an inlet and an outlet, with a movable valve plug therebetween. By adjusting the position of the valve plug, fluid flow through the valve is adjusted. The control valve actuator typically includes a stem connected to the valve plug and provides the necessary motive force for moving the valve plug. The positioner provides a closed loop feedback system that provides pressurized fluid to the control valve actuator (which may include two chambers separated by a diaphragm) and the positioner monitors the position of the valve plug, or more commonly the position of the actuator stem, and compares the position to a desired set point. If a deviation between the actual position and the desired set point is detected which will result in an undesirable flow through the valve, the positioner sends a fluid signal to the actuator to adjust the position of the metering device accordingly.

Such control valve assemblies can be provided in a variety of forms. In one common arrangement the control valve is referred to as a sliding stem valve. In such a valve, a sliding plug or piston is positioned between an inlet and outlet of the valve. Depending on the position of the plug, the cross-sectional area of opening between the inlet and outlet is adjusted, thus allowing more or less fluid to traverse through the valve. The actuator for such a control valve can also be provided in a variety of forms, but commonly has a movable stem directly coupled to a valve stem extending from the valve plug, and employs air pressure, or other fluid pressure, within a diaphragm casing of the actuator to thus cause the actuator stem to move.

The positioner of such a system is typically mounted on the outside of the actuator, and includes a sensor therein adapted to receive a signal from a transmitter mounted on the sliding stem of the actuator. The positioner may include tubing fluidly connecting the positioner to the control valve actuator in order to send fluid signals as control fluid pressure to the actuator. The tubing may be external to the control valve, or the tubing may be incorporated into a housing.

Recently, so called "smart" positioners have been introduced that can diagnose and report certain malfunctions within the control valve. One example of a smart positioner is the FIELDVUE® positioner manufactured by Fisher Controls. Another such positioner is described in U.S. Patent Publication No. 2001/0037159, which is hereby incorporated by reference herein. Such positioners diagnose and report a variety of control valve malfunctions by sending signals to a centralized process controller. Smart positioners may communicate with the centralized process controller via any number of protocols including, but not limited to the FOUNDATION® Fieldbus protocol and the HART™ protocol. While known smart positioners are capable of detecting certain general malfunctions in a control valve, these positioners are not capable of distinguishing between certain types of control fluid leaks within the control valve assembly.

Control fluid leaks in the control valve assemblies can occur between the positioner and the actuator, in the tubing, or in the diaphragm itself. While control fluid leaks in the tubing are generally easy and inexpensive to repair, control fluid leaks in the diaphragm itself are more costly and time consuming to repair. Given that many control valves are located in remote locations in process control systems, repair technicians must carry all parts and tools necessary to repair either a tube leak or a diaphragm leak when a smart positioner reports a control fluid leak.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention.

DETAILED DESCRIPTION OF THE DISCLOSURE

Figure 1:
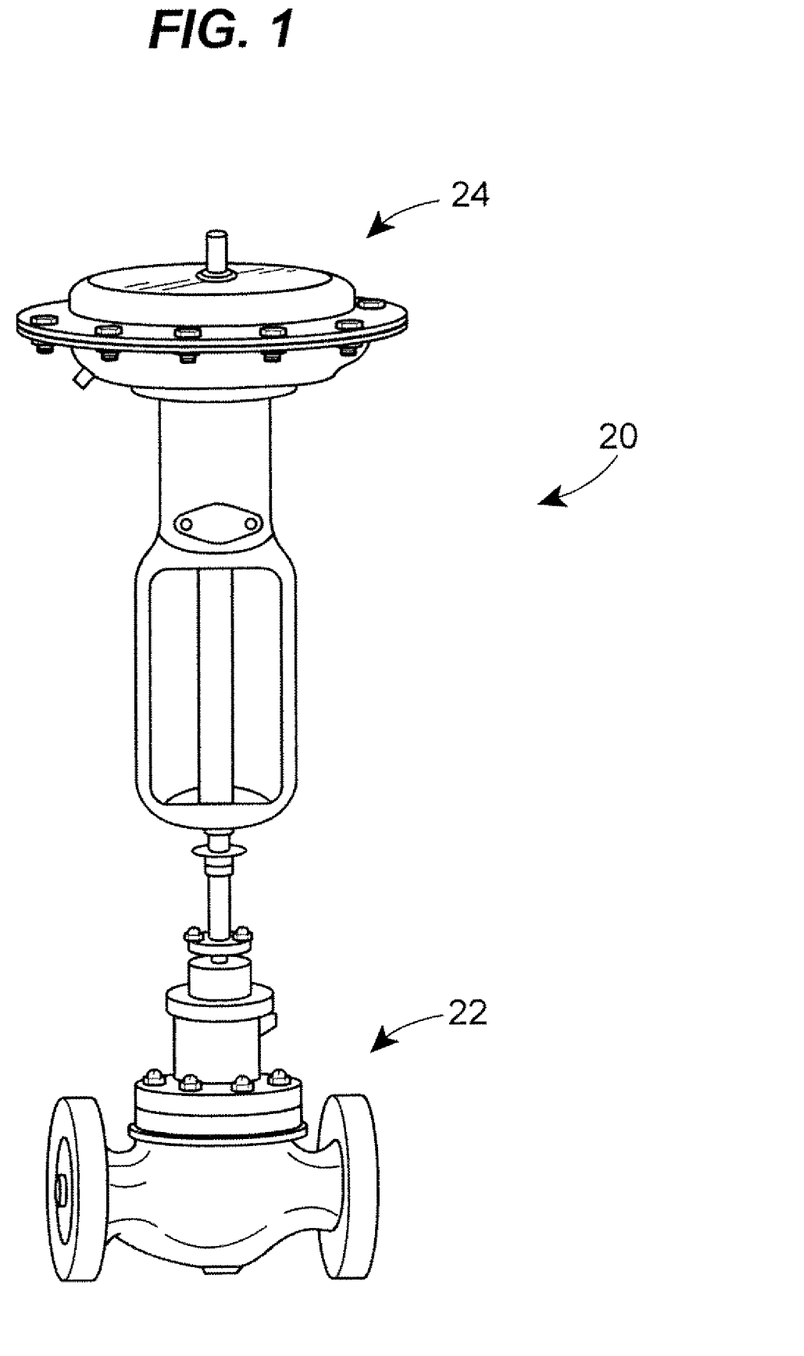
FIG. 1 is a perspective view of a sliding stem control valve assembly constructed in accordance with the teachings of the disclosure.

Referring now to the drawings and with specific reference to FIG. 1, a control valve assembly is generally referred to by reference numeral 20. The control valve assembly 20 includes a control valve 22 to which a control valve actuator 24 is attached. While the control valve assembly 20 described herein will be referred to as a sliding stem type of control valve, the teachings of the disclosure can be used in conjunction with other types of control valves, including but not limited to, rotary valves, butterfly valves, and the like.

Figure 2:
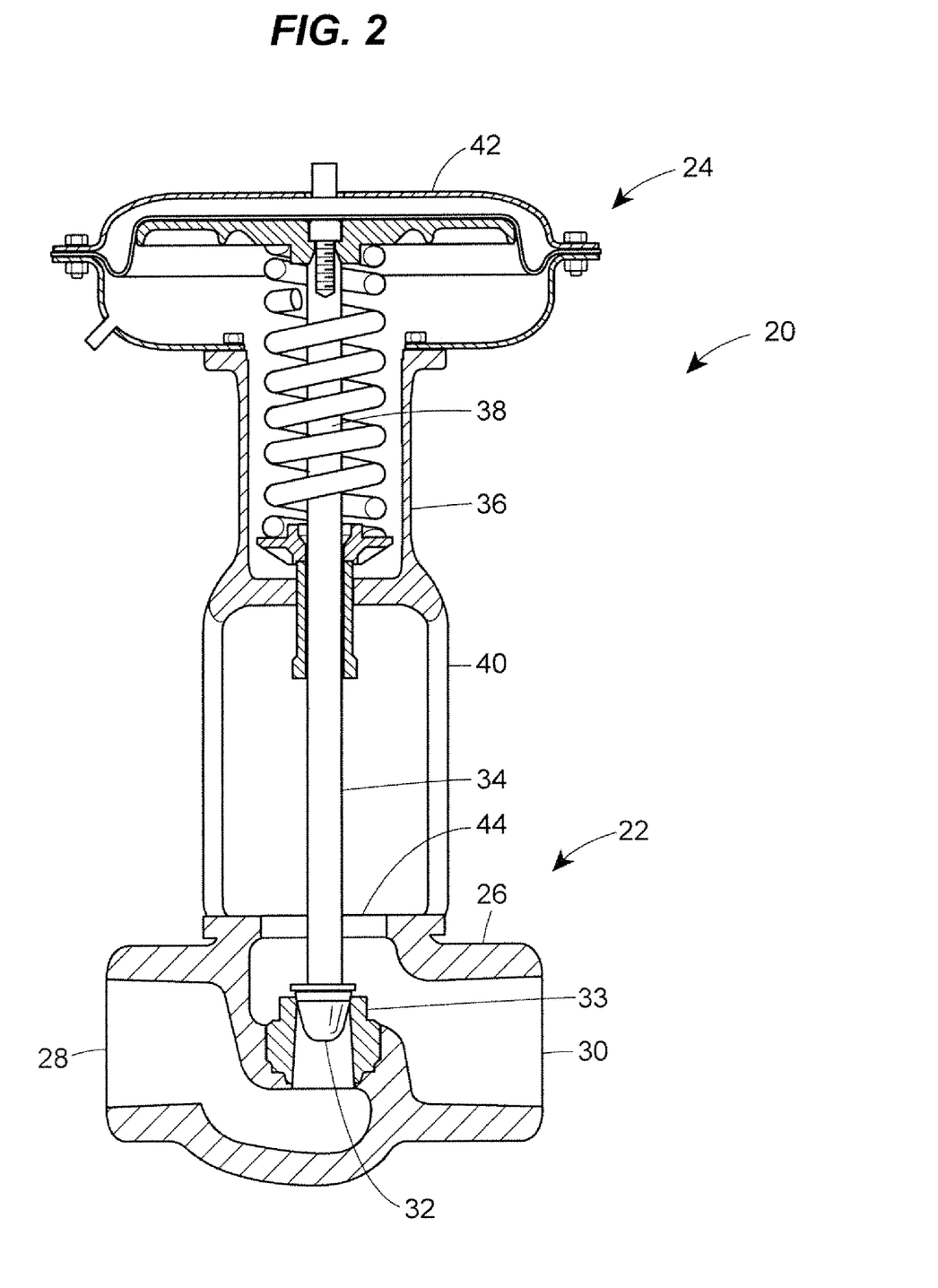
FIG. 2 is a sectional view of the sliding stem control valve of FIG. 1.

Referring now to FIG. 2, the control valve 22 is shown in further detail to include a housing 26 having an inlet 28 and an outlet 30. While not shown, it is to be understood that the valve 22 is adapted to allow fluid to flow from the inlet 28 to the outlet 30, and that by adjusting the position of a valve plug 32 slidably disposed within the housing 26, the volume and rate at which the fluid flows therethrough can be adjusted as well. The position of the plug 32 is adjusted by adjusting the position of a valve stem 34 connected to the plug 32. More specifically, by adjusting the position of the stem 34, it can be seen that the position of the plug 32 relative to a seat ring 33 positioned between the inlet 28 and outlet 30 is also adjusted.

The actuator 24 adjusts the position of the stem 34 and thus the position of the plug 32. The actuator 24 includes a housing 36 in which an actuator stem 38 is adapted to reciprocate. More specifically, in the depicted embodiment, the housing 36 includes a yoke 40 at a base thereof, and a diaphragm casing 42 at a top thereof. The yoke 40 defines a bottom 44 adapted to mount to the valve 22.

Movement of the actuator stem 38 is controlled by spring and fluid pressure. As shown best in FIG. 3, the actuator stem 38 is connected to a diaphragm 48 positioned within the diaphragm casing 42. A coil spring 50 is positioned around the actuator stem 38 and biases the diaphragm 48 upwardly in FIG. 3, by acting on both the diaphragm 48 and a spring seat 52. The spring 50 therefore biases the diaphragm 48, actuator stem 38, valve stem 34, and valve plug 32 upwardly in FIG. 3. Accordingly, it can be seen the control valve 22 could be provided in the form or either a normally open or normally closed valve, depending on the relative relationship between the valve plug 32 and the valve seat 33.

Figure 3:
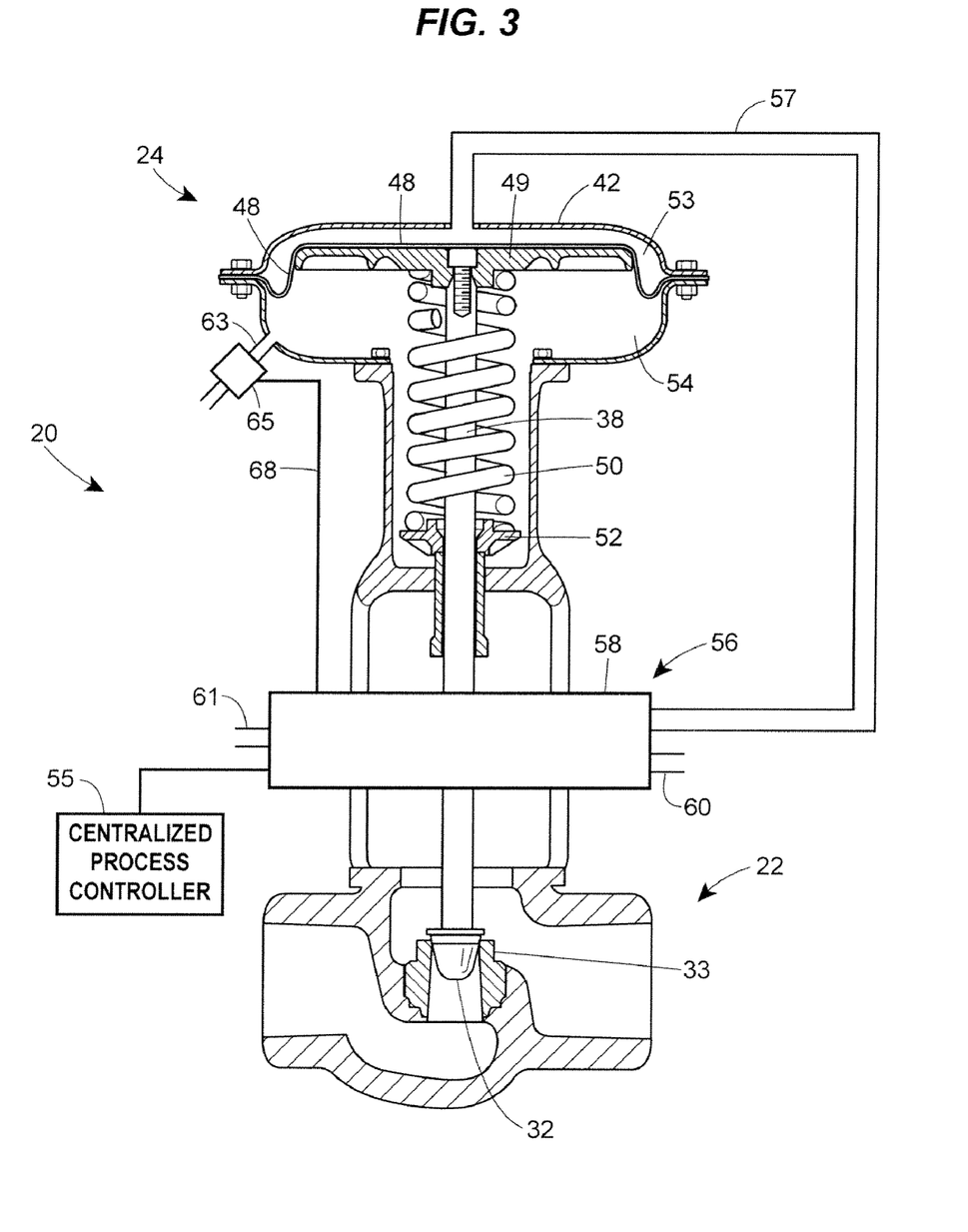
FIG. 3 is a sectional view of sliding stem control valve of FIG. 1, including a positioner.

In order to move the plug 32, and thus adjust the position of the valve 22, control fluid pressure is adjusted in the diaphragm casing 42. More specifically, it will be noted that the diaphragm 48 divides the diaphragm casing 42 into upper and lower chambers 53 and 54, respectively. The diaphragm 48 may be at least partially supported by a diaphragm plate 49. By adjusting the control fluid pressure, typically air pressure, in the upper chamber 53 through a control line 57, the diaphragm plate 48 is caused to move upwardly or downwardly depending on the relative forces between the spring 50 and control fluid pressure in the upper chamber 53.

The actuator 24 depicted is of but one type of actuator adapted to adjust the position of the valve stem and plug of the control valve 22. Other forms of actuators are possible, and included within the scope of the present application.

Using structures such as that described above, it can seen that the position of the plug 32 can be adjusted to thus adjust the flow of fluid through the valve 22. However, in order to accurately position the plug 32, and thus accurately control the flow of fluid through the valve 22, a positioner 56 is provided. The positioner 56 includes a housing 58 having a fluid inlet 60 connected to a pressurized control fluid source (not shown), a control fluid vent 61, and the control line 57. The positioner 56 may include a transmitter (not shown) adapted to generate a signal as the actuator stem 38 moves up and down. Moreover, the positioner 56 may include a receiver (not shown) adapted to monitor the signal generated by the transmitter and thus determine the relative position of the stem 38. In turn, the position of the plug 32 is determined and if the plug 32 is not positioned appropriately, a corresponding correction signal can be generated by the positioner 56 and sent though the control line 57 to actuate the stem 38 by changing control fluid pressure in the upper chamber 53. More specifically, the positioner 56 may include a processor and memory (not shown), the received signal may be compared by the processor to a set point stored in the memory, to thus generate the correction signal. Alternatively, the positioner 56 may communicate the received signal to a remote processor, by direct wiring, RF communication, or the like, with the remote processor then generating and transmitting the correction signal to the actuator 24.

As control fluid pressure in the upper chamber 53 is increased, the diaphragm 48 moves downward as the control fluid pressure in the upper chamber 53 overcomes the spring force generated by the spring 50. As the diaphragm 48 moves downward in this figure, volume of the lower chamber 54 decreases and volume of the upper chamber 53 increases. The increased volume of the upper chamber 53 is filled by incoming control fluid through the control line 57. The lower chamber includes an actuator vent 63 to allow fluid to escape from the lower chamber 54 as the volume of the lower chamber 54 decreases. Likewise, when the control fluid pressure in the upper chamber 53 decreases, the volume of the upper chamber 53 decreases while the volume of the lower chamber 54 increases. The positioner vents control fluid from the upper chamber 53 through the vent 61 by way of the control line 57 as the volume of the upper chamber decreases and fluid enters the lower chamber 54 through the actuator vent 63 to fill the expanding volume of the lower chamber 54.

The positioner 56 diagnoses and may report certain malfunctions in the control valve assembly 20 to a centralized process controller 55. In particular, the positioner 56 detects and reports control fluid leaks within the control valve assembly 20. Control fluid leaks typically occur in one of two locations. First, a control fluid leak can occur in the control line 57, for example in external tubing. Second, a control fluid leak can occur in the diaphragm 48 itself, for example through a tear or hole in the diaphragm 48. In order to distinguish between leaks in these two locations, the control valve assembly 20 includes a flow switch 65 installed on the actuator vent 63. The flow switch 65 is a passive device that does not require any power.

A status of the flow switch 65 is polled or monitored by the positioner 56 through a communication connection, such as line 68. The status of the flow switch 65 may be monitored at regular or irregular intervals, or the status of the flow switch 65 may be polled or checked when the positioner 56 detects a malfunction, such as an air leak. As a illustration, the status of the flow switch 65 may be periodically monitored at regular time intervals, for example, once every minute, five minutes, 10 minutes, etc. Alternatively, the positioner 56 may monitor the status of the flow switch 65 at irregular intervals, such as when the positioner 56 detects an air leak, or when the positioner 56 detects any other malfunction in the control valve assembly 20. Polling the flow switch 65 when the positioner 56 detects a malfunction enables the positioner 56 to diagnose and locate a source of the malfunction and report the source of the malfunction to the centralized process controller 55. The communication connection between the positioner 56 and the flow switch 65 can be any type of communication connection suitable for transmitting a flow switch 65 status to the positioner 56, such as, for example, a wired connection, a wireless connection, an infrared connection, a radio frequency connection, etc. Virtually any type of flow switch 65 may be used. Examples of flow switches 65 include the Gentech FCS-04, the Malema M-60, and the Malema M064 flow switches. Additionally, the flow switch 65 may be closed on a low flow condition, or closed on a high flow condition. It is only important that the position of the flow switch 65 indicate one particular flow condition.

Figure 4:
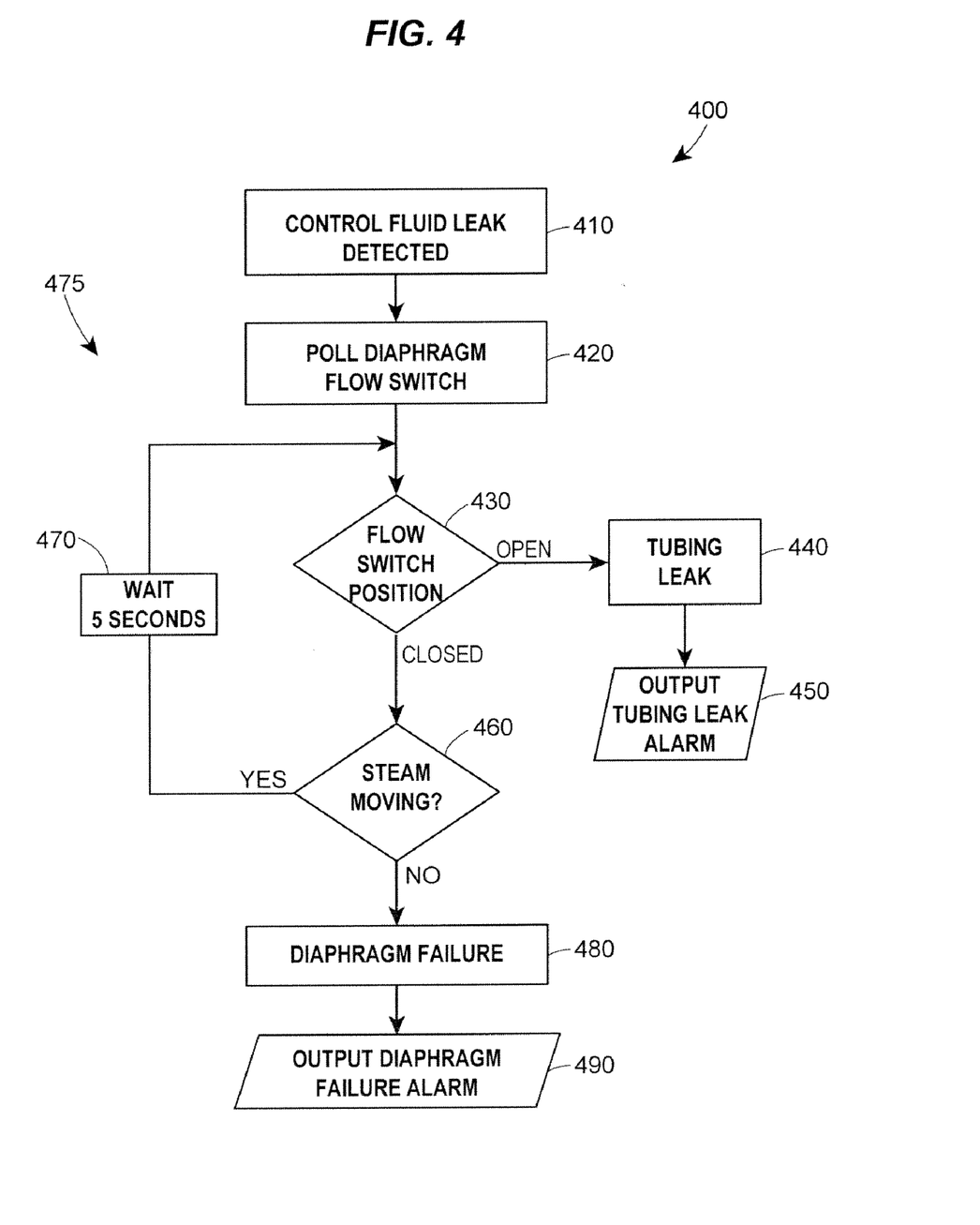
FIG. 4 is a logic diagram of a method for diagnosing the location of a control fluid leak in the sliding stem control valve of FIG. 1.

As shown in FIG. 4, the positioner 56 includes logic 400 that resolves the location of a control fluid leak when a control fluid leak is detected. The logic begins at step 410 when a control fluid leak is detected, for example when the positioner 56 sends a control signal to the actuator, but the valve stem fails to move, or the valve stem moves at a rate that does not correspond with the control signal. The positioner 56 polls the flow switch 65 through the communication connection 68 at step 420. The flow switch 65 position is determined at step 430. If the flow switch 65 position is open at step 430, a low flow condition is indicated which means a leak in the control line 57 as indicated at 440. Once a leak in the control line 57 is determined, the positioner 56 may output a control line leak alarm at 450 which may be transmitted to the central process controller. If the flow switch 65 is closed at step 430, the positioner 56 determines whether the stem 38 is moving at 460 by monitoring sensors that detect stem 38 movement. A moving stem 38 indicates that at least some of the control signal fluid is entering the upper chamber 53 of the actuator housing 42 causing the diaphragm 48 to move. If the stem 38 is moving, the positioner 56 waits 5 seconds at step 470 and then re-polls the flow switch 65 at step 430. Feedback loop 475 is repeated until the flow switch 65 indicates closed and the stem 38 is not moving. When the flow switch 65 is closed (indicating a high flow condition) and the stem 38 is not moving, a leak in the diaphragm 48 is indicated at step 480. The positioner 56 may output a diaphragm failure alarm at step 490 and may send the alarm to the central process controller. The logic 400 shown in FIG. 4 is for a flow switch that is open in a low flow condition. To adapt the logic for a flow switch that is closed in a low flow condition, the open and closed outputs from step 430 may be reversed.

Figure 5:
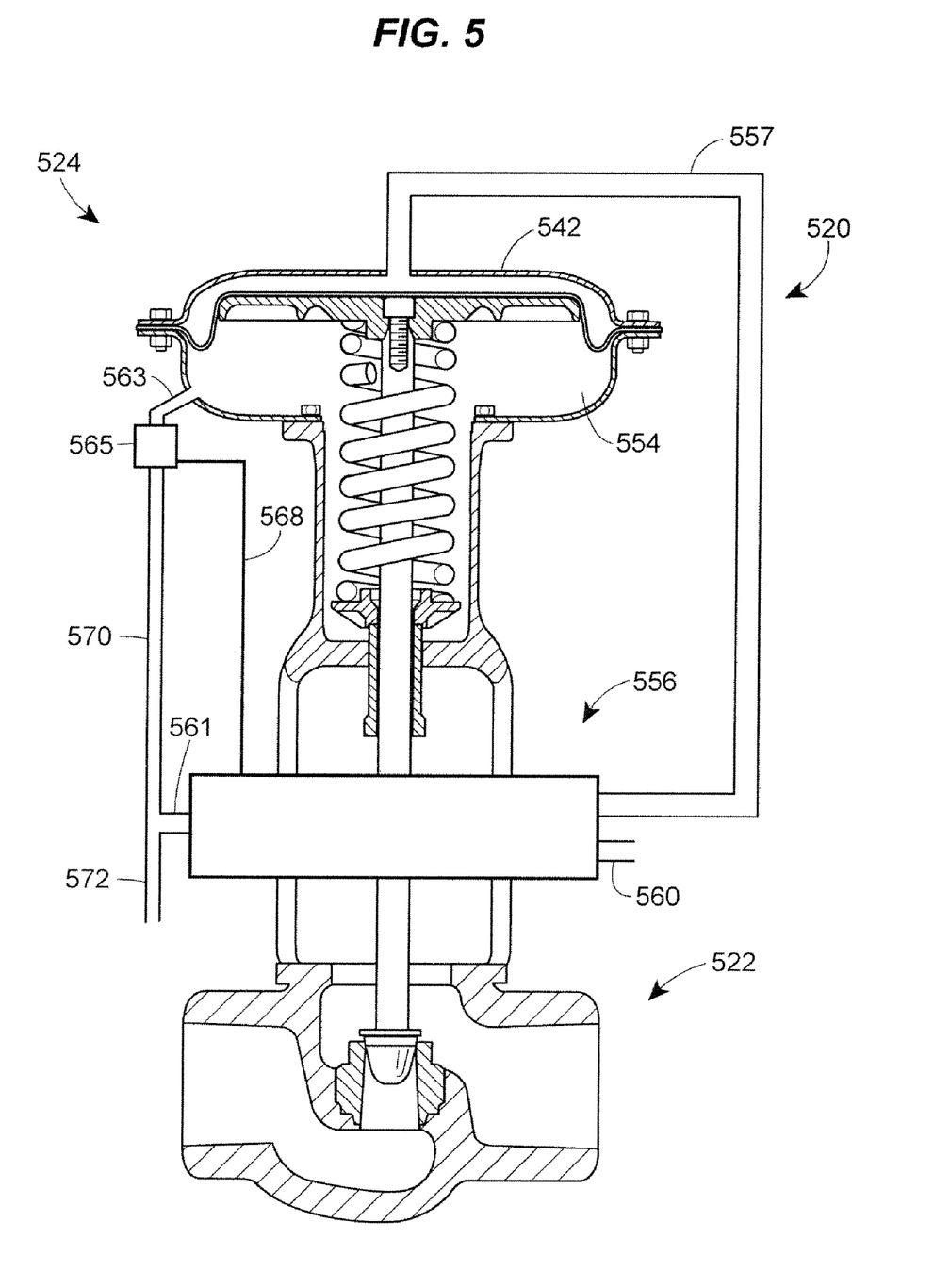
FIG. 5 is an alternate embodiment of a sliding stem control valve assembly constructed in accordance with the teachings of the disclosure.

Referring now to FIG. 5, an alternate embodiment of a control valve assembly 524 constructed in accordance with the teachings of the disclosure is illustrated. Like the embodiments of FIGS. 1-3, the control valve assembly 524 includes a control valve 522, an actuator 524, and a positioner 556. The positioner 556 has a control fluid inlet 560 that is connected to a pressurized control fluid source (not shown) and a control fluid vent 561 to vent excess pressurized control fluid. The actuator 524 includes a housing 542 having an actuator vent 563 for venting fluid from the housing 542 during actuator 524 operation. Also like the embodiment of FIGS. 1-3, the vent 563 may include a flow switch 565 that is communicatively connected to the positioner 556 through a communication line 568. Rather than being vented directly to the atmosphere, however, as in the embodiment of FIGS. 1-3, the flow switch 565 is connected to the control fluid vent 561 through a vent line 570. The vent line 570 and the control fluid vent 561 join and both are vented to the atmosphere through line 572. By constantly venting a small amount of pressurized fluid through the control fluid vent 561, fluid within the vent line 570 remains at a pressure slightly above atmospheric pressure. Thus, atmospheric pressure is not allowed to enter the vent line 570. In other words, the constant small flow of control fluid out of the control fluid vent 561 continually purges the fluid in the lower chamber 554 without affecting operation of the diaphragm. As a result, fluid traveling into and out of the lower diaphragm chamber 554 during operation of the actuator 524 is always pressurized control fluid. Typically, pressurized control fluid is filtered and dehumidified. Thus, the internal components of the actuator 524 are not subject to atmospheric impurities and/or corrosive compounds. As a result, the control valve assembly 520 is ideally suited to uses where the control valve assembly may be subject to corrosive atmospheric conditions or fugitive emissions that would shorten the life of internal actuator components. For example, the control valve assembly 520 shown in FIG. 5 is ideally suited for marine operations.

Figure 6:
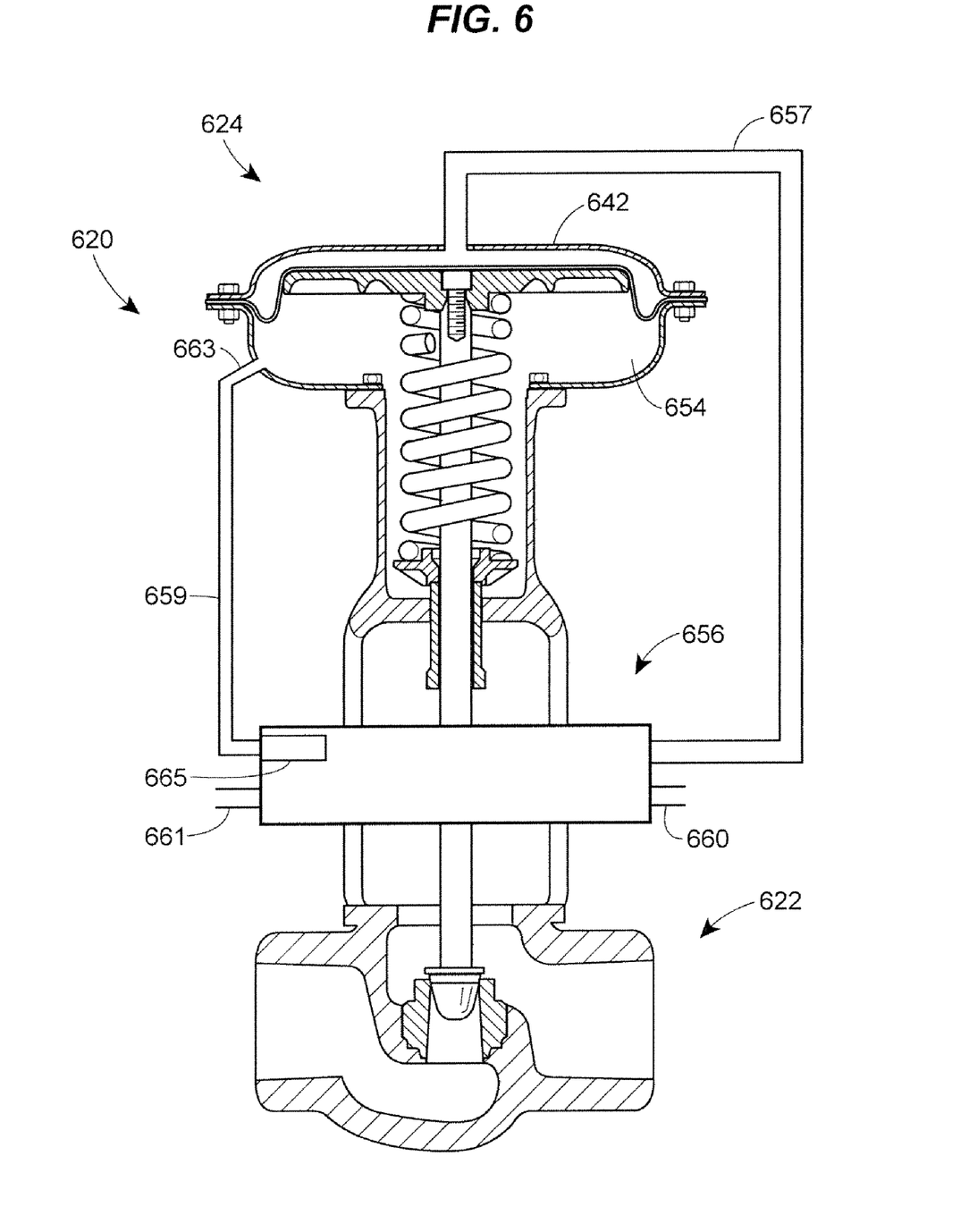
FIG. 6 is yet another alternate embodiment of a sliding stem control valve assembly constructed in accordance with the teachings of the disclosure.

Referring now to FIG. 6, an alternate embodiment of a control valve assembly 620 constructed in accordance with the teachings of the disclosure is illustrated. Like the embodiments of FIGS. 1-3, the control valve assembly 620 includes a control valve 622, an actuator 624, and a positioner 656. The positioner 656 has a control fluid inlet 660 that is connected to a pressurized fluid source (not shown) and a positioner vent 661 to vent excess pressurized control fluid. The actuator 624 includes a housing 642 having a vent 663 for venting fluid from the housing 642 during actuator 624 operation. The positioner 656 shown in FIG. 6 includes an internally mounted flow switch 665. In this embodiment, the flow switch 665 is a passive device and does not require any power. The flow switch 665 may be mounted in the positioner 656 during assembly, or the flow switch 665 may be retrofitted to an existing positioner 656. The actuator vent 663 may be connected to the positioner 656, and thus to the flow switch 665 through line 659. As a result, the internally mounted flow switch 665 is fluidly connected to the lower chamber 654. Thus, the lower chamber 654 of the actuator housing 642 is isolated from environmental conditions, and internal components of the actuator 624 are protected from harmful atmospheric elements, similar to the embodiment of FIG. 5. One advantage to the positioner 656 having an internally mounted flow switch 665 is that such a positioner 656 may be easily mounted to a control valve assembly 620 having an existing positioner without a flow switch. In this way, virtually any control valve assembly 620 can be upgraded to a control valve assembly capable of detecting and diagnosing air leaks as described above. Moreover, the internally mounted flow switch 665 is protected from environmental conditions and from damage that may occur during transportation and installation.

As opposed to prior art control valve assemblies, the control valve assembly of the present disclosure is capable of distinguishing between different types and/or locations of control fluid leaks. This ability advantageously allows a technician to select appropriate tools and parts before departing to fix a control valve assembly that may be located in a remote location.

From the forgoing, one of ordinary skill in the art will readily understand that through the teachings of the disclosure, a control valve assembly can be constructed having a valve positioner capable of distinguishing between different types of malfunctions. Moreover, a control valve assembly can be constructed that protects the inner components of an actuator from harmful environmental conditions.

What is claimed is:

1. A control valve assembly, comprising:
 a control valve having a fluid inlet and a fluid outlet, the control valve comprising a valve plug being movably positioned between the fluid inlet and the fluid outlet to control the flow of fluid through the valve;
 an actuator for moving the valve plug, the actuator comprising an actuator housing and a diaphragm mounted within the actuator housing, the diaphragm dividing the actuator housing into at least two chambers, at least one of the chambers including an actuator vent and at least one of the chambers including an actuator control fluid inlet, and a valve stem connected to the diaphragm and the valve plug, the valve stem being arranged to move the valve plug in response to movement of the diaphragm;
 a positioner comprising a positioner control fluid inlet, a control fluid vent, and a control line, the control line being connected to the control fluid inlet;
 wherein the actuator vent is connected to a flow switch capable of detecting a flow condition through the actuator vent, the flow switch being communicatively connected to the positioner, and
 wherein the positioner is arranged to distinguish between a control fluid leak in the control fluid line and a control fluid leak in the diaphragm and to send an alarm to a central controller when a leak of control fluid is detected, and the alarm sent to the central controller includes information that identifies the type of control fluid leak.

2. The control valve assembly of claim 1, wherein the positioner is arranged to determine a flow condition through the actuator vent by polling the flow switch for a position of the flow switch.

3. The control valve assembly of claim 1, wherein an open position of the flow switch indicates a low flow condition through the actuator vent.

4. The control valve assembly of claim 1, wherein a closed position of the flow switch indicates a low flow condition through the actuator vent.

5. The control valve assembly of claim 1, wherein the flow switch is connected to the positioner via a wireless connection.

6. The control valve assembly of claim 1, wherein the control fluid is a gas.

7. A control valve assembly comprising:
a control valve having a fluid inlet and a fluid outlet, the control valve comprising a valve plug being movably positioned between the fluid inlet and the fluid outlet to control the flow of fluid through the valve;
an actuator for moving the valve plug, the actuator comprising an actuator housing and a diaphragm mounted within the actuator housing, the diaphragm dividing the actuator housing into at least two chambers, at least one of the chambers including an actuator vent and at least one of the chambers including an actuator control fluid inlet, and a valve stem connected to the diaphragm and the valve plug, the valve stem being arranged to move the valve plug in response to movement of the diaphragm;
a positioner comprising a control fluid inlet, a control fluid vent, and a control line, the control line being connected to the control fluid inlet,
wherein the actuator vent is connected to a flow switch capable of detecting a flow condition through the actuator vent, the flow switch being communicatively connected to the positioner, and wherein the control fluid vent is joined to the actuator vent.

8. The control valve assembly of claim 7, wherein both the control fluid vent and the actuator vent are vented to the atmosphere downstream of the location at which the control fluid vent joins the actuator vent.

9. The control valve assembly of claim 7, wherein the flow switch is positioned between the actuator vent and the control fluid vent.

10. A method of determining a failure mode in a control valve assembly comprising:
detecting a leak in control fluid;
polling a flow switch connected to an actuator vent to determine a position of the flow switch;
determining whether the flow switch is open or closed;
determining a flow condition through the actuator vent based on the position of the flow switch;
determining whether a valve stem is moving;
waiting for a period of time if the valve stem is moving before subsequently polling the flow switch;
outputting a control line leak alarm if the flow switch indicates a low flow condition through the actuator vent; and
outputting a diaphragm leak alarm if the flow switch indicates a high flow condition through the actuator vent and the valve stem is not moving.

11. The method of claim 10, wherein the period of time is approximately 5 seconds.

12. A control valve assembly, comprising:
a valve having a fluid inlet and a fluid outlet, the valve comprising a valve plug positioned between the fluid inlet and the fluid outlet to control the flow of fluid through the valve;
an actuator for moving the valve plug, the actuator comprising an actuator housing and a diaphragm mounted within the actuator housing, the diaphragm dividing the actuator housing into at least two chambers, at least one of the chambers including an actuator vent and at least one of the chambers including an actuator control fluid inlet;
a valve stem connected to the diaphragm and the valve plug, movement of the diaphragm moving the stem, which in turn moves the valve plug; and
a positioner comprising a control fluid inlet, a control fluid vent, and a first control line, the first control line being connected to the actuator control fluid inlet and the control fluid vent being connected to the actuator vent;
wherein a flow switch detects a flow condition through the actuator vent, the flow switch being communicatively connected to the positioner, the positioner determining a flow condition through the actuator vent by polling the flow switch and the positioner sending an alarm to a central controller when the positioner detects a leak of control fluid, the positioner distinguishing between a control fluid leak in the control fluid line and a control fluid leak in the diaphragm.

13. The control valve assembly of claim 12, wherein the positioner comprises the flow switch.

* * * * *

UNITED STATES PATENT AND TRADEMARK OFFICE
CERTIFICATE OF CORRECTION

| | |
|---|---|
| PATENT NO. | : 8,312,892 B2 |
| APPLICATION NO. | : 12/497059 |
| DATED | : November 20, 2012 |
| INVENTOR(S) | : Galen D. Wilke |

Page 1 of 1

It is certified that error appears in the above-identified patent and that said Letters Patent is hereby corrected as shown below:

In the Specification:

At Column 3, line 37, "can seen" should be -- can be seen --.

At Column 3, line 56, "shown), the" should be -- shown). The --.

At Column 4, line 32, "a illustration" should be -- an illustration --.

Signed and Sealed this
Eighteenth Day of November, 2014

Michelle K. Lee
*Deputy Director of the United States Patent and Trademark Office*